No. 638,665. Patented Dec. 5, 1899.
A. R. GREEN.
CAR TRUCK.
(Application filed Mar. 29, 1899.)
(No Model.) 2 Sheets—Sheet 2.
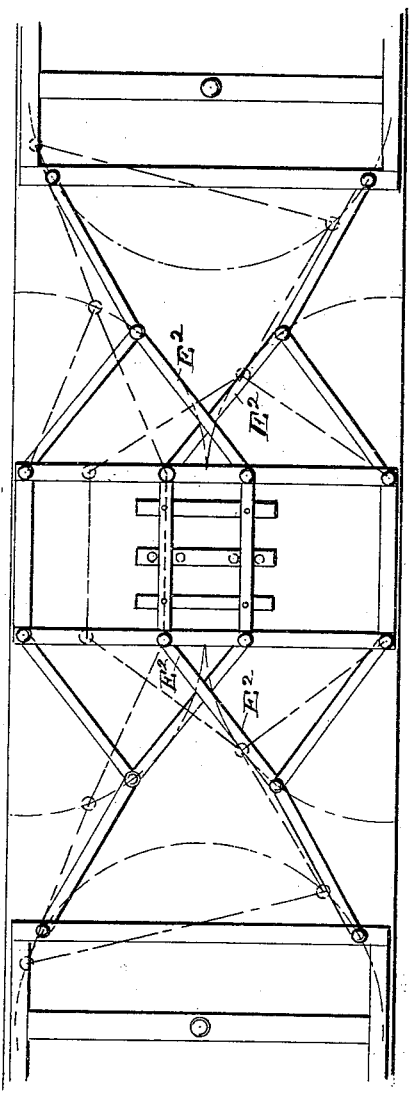
WITNESSES:
INVENTOR
Alexander R. Green,
BY
ATTORNEYS.

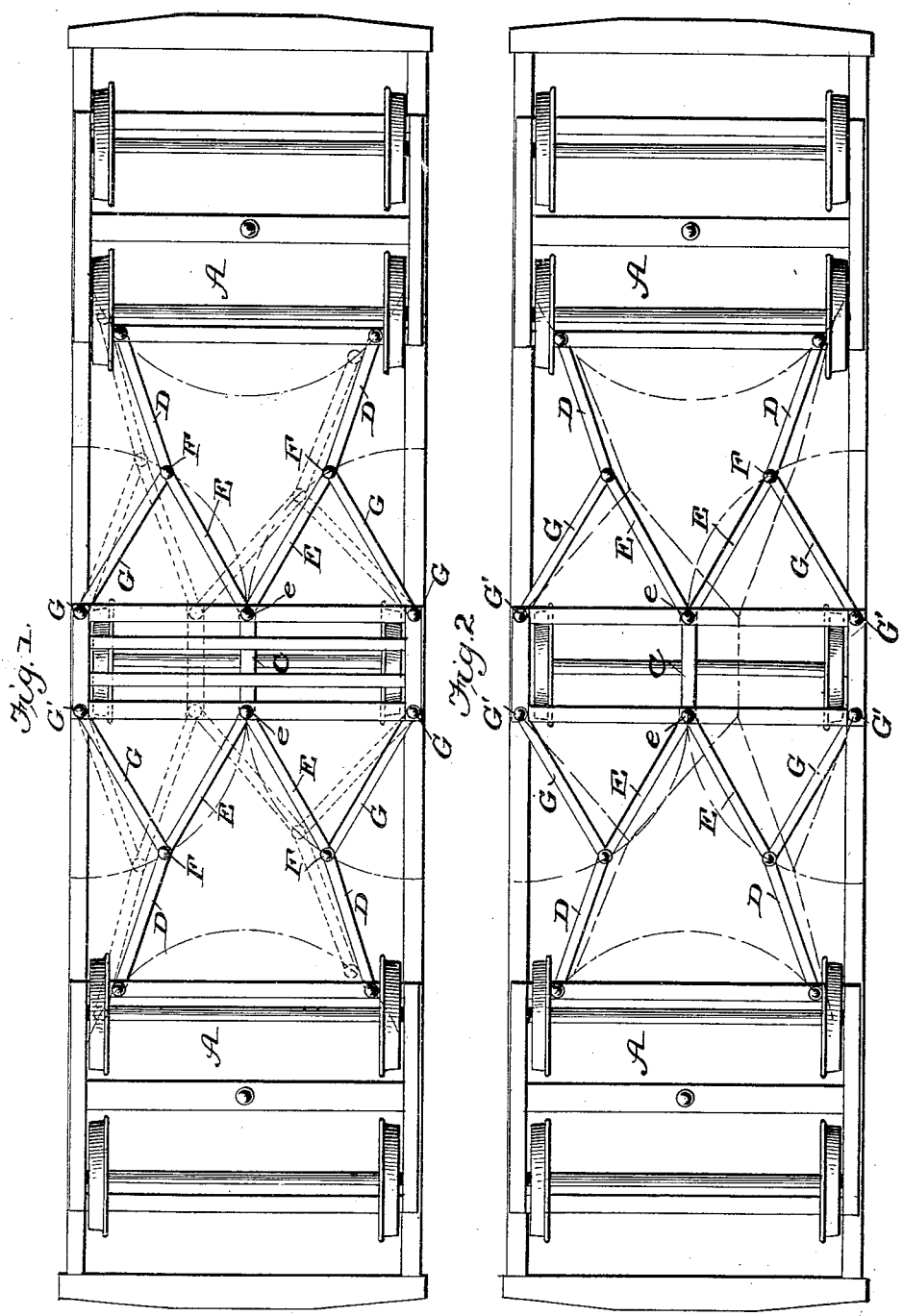

UNITED STATES PATENT OFFICE.

ALEXANDER R. GREEN, OF HOUSTON, VIRGINIA.

CAR-TRUCK.

SPECIFICATION forming part of Letters Patent No. 638,665, dated December 5, 1899.

Application filed March 29, 1899. Serial No. 711,001. (No model.)

*To all whom it may concern:*

Be it known that I, ALEXANDER R. GREEN, residing at Houston, in the county of Halifax and State of Virginia, have made certain new and useful Improvements in Car-Trucks, of which the following is a specification.

My invention is an improvement in car-trucks, having for an object improved constructions for adjusting the trucks of cars to cause the same to move easily in rounding curves; and the invention consists in certain novel constructions and combinations of parts, as will be hereinafter described, and pointed out in the claims.

In the drawings, Figure 1 is a bottom plan view of a car, parts being broken away and others shown in section, with the parts in full lines as when moving on a straight line and in dotted lines as when rounding a curve. Fig. 2 is a similar view showing the parts in dotted lines in rounding a curve opposite that shown in Fig. 1, and Fig. 3 shows a somewhat different arrangement of the parts.

In carrying out my invention the end trucks A are pivoted and the intermediate truck is arranged to move radially beneath the car, and these trucks may be constructed and connected with the car to secure such movement in any desired manner. By preference I form the radial truck with a framing having at its center a bar C, extending from front to rear, to which are connected the pitman connections, as shown, in order to secure a strong bracing between the pitman connections leading to the opposite end trucks. Pitman connections extend between the radial truck and the end trucks, two of such connections being provided for each end truck and connecting with the end trucks on opposite sides of the pivot of said truck. Each pitman connection is composed of two sections D and E, which are pivoted together at their meeting ends F and at their other ends, respectively, to the end and radial trucks, so the movement of the radial truck will operate the end trucks as desired. In connection with the pitman connection I provide the brace-rod G, one for each of the pitman connections. At one end the rod G is pivoted to the pitman connection at the joint of the sections D and E of said connection, while the other end of the brace-rod G is pivoted at G' to the car, so such end G' of the rod is held to the car, while the radial truck moves beneath the car to effect the desired operation of the pitman connection, and thereby the operation of the end truck, as will be understood from the drawings.

It will be seen that the radial truck as it moves from side to side beneath the car will positively operate the end trucks by means of the two pitman connections operating on opposite sides of the pivot of each of the end trucks. In this operation one pitman connection will draw upon the end truck on one side while the opposite pitman connection will push upon the same end truck on the opposite side, so the two pitman connections will operate positively upon the same end truck. In these movements the brace-rods G operate both to guide and brace the pitman connections in securing the desired movements.

In the construction shown and as preferred the sections E of the pitman connection are pivoted at e to the radial truck at the same point and at a point about midway between the opposite ends of the said radial truck, so the sections E, the rods G, and the radial truck form triangles, which are approximately equilateral when the car is moving on a straight line and which vary as the car rounds a curve.

In Fig. 3 I show an arrangement similar to that shown in Figs. 1 and 2, except that the sections E² of the pitman connections cross each other adjacent to the radial truck and pivot to such truck on opposite sides of a central line, the operation being the same as in the other construction.

The purpose of my invention, it will be seen, is to lessen greatly or remove entirely the friction between the car-wheels and the rails of the track (both on the side and top) in passing around curves. First, the outside rail on all curves being considerably longer than the inside one, this difference in length must be made up by the outside wheel in the same time when attached fast to same axle with inside wheel and must slide, and, second, the friction between the flange of the wheel and inside of rail is mostly due to the fact that the trucks as ordinarily attached to the cars in passing around a curve would follow directly in the line in which the car was drawn, or rather on the chord of the arc, instead of on the circumference, and the wheels are only allowed to take the curve of the rails by the amount of play permitted between the flanges of opposite wheels and the rails, which play greatly increases the rocking of the cars from side to side and remains a constant menace to the safety of travel and transportation. In order to overcome the difficulty first mentioned, the wheels of the trucks should in practice have separate axles, so as to move independently, the one faster or slower than the other, as it might be on the outside or inside of the curve. I seek to overcome the difficulty mentioned secondly by coupling the front and rear trucks of a car in such a manner and by such devices as shall give positive and complete guidance and control of them to a central guide-truck which is permitted to oscillate freely under the car, as its wheels may be directed by the curve of the rails, and being attached to the coupling, and through it to the body of the car.

My invention, it will be seen, is an improved coupling device between the front and rear trucks of cars of such mechanism and arranged in such manner as (shown in the accompanying drawings) to give control of them to the central or guide truck, to which it is firmly attached, as well as to the body of the car, and in such manner as will appear from said drawings, the outside of said coupling device being attached to the body of the car and the inside being attached firmly to the frame of the guide-truck and sliding freely with it under the car while controlling the rotary motion of front and rear trucks, causing the axles thereof to assume the position of radii of the curve being passed, while the flanges of the wheels of front and rear trucks would strike the rails on the tangent points of the curves, and in applying this system to the shorter cars of street-railways, either cable or electric, instead of employing a central radial truck as the radially-operating guide there may be a guide-bar extending down from the center of the sliding frame and rigidly attached thereto by proper braces into and through the central slot for the plow or grip of the same, thus securing the same control through the said guide-bar over the front and rear trucks as was secured by the central truck in cars of greater length, and in the construction of the said coupling of the front and rear trucks framed in such manner and attached both to the body of the car, as well as to said front and rear trucks and also to the central or radial truck or central guide-bar, as above mentioned, through said pitman connections, and said radial truck or guide-bar may be constructed in any manner and connected both to the car and front and rear trucks by any combination of pitman-bars, ratchet-wheels and bars, or both, in such manner as to secure positive control of same.

Having thus described my invention, what I claim, and desire to secure by Letters Patent, is—

1. The combination substantially as herein described of the end truck, the radial truck, a pitman connection consisting of sections pivoted together at their meeting ends and at their other ends respectively to the end and radial trucks, and the brace-rod pivoted at its outer end to the car and at its inner end to the pitman connection substantially as set forth.

2. The combination with the end truck and the radial truck of the pitman connection having sections jointed together and to the end and radial trucks and the brace-rod jointed to the car at one end and to the pitman connection at its other end such joint with the pitman connection being at the connection of the sections thereof, one section of the pitman connection forming together with the radial truck and brace-rod, a triangle substantially as set forth.

3. The herein-described improvement in trucks consisting of the pivoted end truck, the radial truck, the pitman connections composed of sections jointed together at their meeting ends and at their other ends respectively to the end and radial trucks and brace-rods connected with such pitman connection at the joint of its sections and having pivotal connection with the car substantially as set forth.

4. The combination of the end trucks, the radial truck having frame-bars extending from front to rear, the pitman connections between the end trucks and the radial truck, such connections being jointed to the frame-rods of the radial truck, and the brace-rods pivoted at one end to the car and at their other ends to the pitman connections substantially as set forth.

5. The combination substantially as described of the end trucks, a radially-operating guide between said trucks, a pitman connection consisting of sections pivoted together at their meeting ends and at their outer ends respectively to the end trucks and radially-operating guides, and the brace-rods pivoted at one end to the car and at their other ends to the pitman connections substantially as set forth.

ALEXANDER R. GREEN.

Witnesses:
SOLON C. KEMON,
PERRY B. TURPIN.